(12) United States Patent
Gandhiraman et al.

(10) Patent No.: US 11,241,833 B2
(45) Date of Patent: Feb. 8, 2022

(54) 3D PRINTED ELECTRONICS USING DIRECTIONAL PLASMA JET

(71) Applicant: Universities Space Research Association, Mountain View, CA (US)

(72) Inventors: Ramprasad Gandhiraman, Sunnyvale, CA (US); Meyya Meyyappan, Pacifica, CA (US); Jessica E. Koehne, Portola Valley, CA (US)

(73) Assignee: UNIVERSITIES SPACE RESEARCH ASSOCIATION, Columbia, MD (US)

( * ) Notice: Subject to any disclaimer, the term of this patent is extended or adjusted under 35 U.S.C. 154(b) by 98 days.

(21) Appl. No.: 15/454,920

(22) Filed: Mar. 9, 2017

(65) Prior Publication Data

US 2017/0259501 A1    Sep. 14, 2017

Related U.S. Application Data

(60) Provisional application No. 62/305,967, filed on Mar. 9, 2016.

(51) Int. Cl.
| | | |
|---|---|---|
| *B29C 64/321* | (2017.01) | |
| *B33Y 30/00* | (2015.01) | |

(Continued)

(52) U.S. Cl.
CPC ............ *B29C 64/321* (2017.08); *B22F 12/00* (2021.01); *B29C 64/106* (2017.08);
(Continued)

(58) Field of Classification Search
CPC ......... B22F 12/00; B33Y 30/00; B33Y 40/00; B33Y 70/00; B33Y 70/10; B29C 64/321
See application file for complete search history.

(56) References Cited

U.S. PATENT DOCUMENTS

| | | | |
|---|---|---|---|
| 2002/0104824 A1* | 8/2002 | Silverbrook | B41J 2/1433 216/27 |
| 2008/0145553 A1* | 6/2008 | Boulos | B05D 3/141 427/447 |

(Continued)

OTHER PUBLICATIONS

U.S. Appl. No. 62/135,826, Tsai, Tsung-Chan, filed Mar. 2015.*

(Continued)

*Primary Examiner* — Philip C Tucker
*Assistant Examiner* — Jimmy R Smith, Jr.
(74) *Attorney, Agent, or Firm* — Whiteford, Taylor & Preston, LLP; Peter J. Davis (57) ABSTRACT

A device and method for printing 3D articles including electronic and functional elements including 3D printer and a plasma jet printer based on a dielectric barrier atmospheric pressure plasma jet system in which both printing and in-situ treatment and post-deposition treatment can be carried out to tailor the materials characteristics. Plasma jet printer comprising of electrodes in the nozzle/print head for applying electric field and generating atmospheric plasma that could be used for non-gravity based highly directional printing in any direction. Integration of dielectric barrier plasma printer and plasma treatment jets with the 3D printer increases the capability of embedding high performance electronics in a 3D printed structure aiding in additive manufacturing of functional devices. Ability to use a range of materials for print head assembly including micro machined silicon increases the resolution of the plasma jet printer to sub-micron level.

12 Claims, 4 Drawing Sheets

(51) Int. Cl.
  *B33Y 70/00*    (2020.01)
  *B33Y 50/02*    (2015.01)
  *B29C 64/106*   (2017.01)
  *B29C 64/188*   (2017.01)
  *B22F 12/00*    (2021.01)
  *B22F 10/10*    (2021.01)

(52) U.S. Cl.
  CPC ............ *B29C 64/188* (2017.08); *B33Y 30/00* (2014.12); *B33Y 50/02* (2014.12); *B33Y 70/00* (2014.12); *B22F 10/10* (2021.01); *B22F 2202/13* (2013.01); *B22F 2999/00* (2013.01)

(56) References Cited

U.S. PATENT DOCUMENTS

2016/0271874 A1* 9/2016 Tsai .................... B29C 67/0059
                                                            264/401
2016/0325487 A1* 11/2016 Miller .................... B29C 59/14

OTHER PUBLICATIONS

Gandhiraman, R.P, et al., "Plasma Jet Printing of Electronic Materials on Flexible and Nonconformal Objects", ACS Appl. Mater. Interfaces Nov. 2014, 6, pp. 20860-20867.*

* cited by examiner

3D PRINTED ELECTRONICS USING DIRECTIONAL PLASMA JET

STATEMENT OF GOVERNMENT RIGHTS

This invention was made with Government support under contract awarded by NASA. The Government has certain rights in this invention.

BACKGROUND OF THE INVENTION

Field of the Invention

This invention relates to the field of additive printing.

Description of the Background

Additive manufacturing, also known as 3D printing, using plastic, metals, ceramic, biomaterials, biological materials is revolutionizing manufacturing industries with endless applications. Additive manufacturing using the above mentioned materials individually are well developed. However, additive manufacturing that integrates printing of two or more different materials like plastic, ceramic, metal etc., to form a single end product with desired features is yet to be developed. For example, 3D printing of electronic components on plastics, metals or biomaterials to manufacture an electronic device is severely limited with the type of materials to be used and the compatibility with the process adopted. Imparting electrical properties (semiconducting, metallic, dielectric etc.) to 3D printed objects as an inline manufacturing process is desirable but extremely difficult at present.

Key challenges associated with integration of electronic material deposition with 3D printing of plastics, metals, ceramics, biomaterials etc., arise from the fact that the thermal, electronic, mechanical and chemical characteristics of the primary material vary significantly from those of the electronic materials to be deposited. Also, the rough and non-conformal features associated with complex 3D patterns pose another challenge by requiring conformal deposition in uneven surfaces, unlike traditional electronic device fabrication.

State of the art electronic materials printing technologies are gravity based and hence require the surface to be coated is placed horizontally with the printing head facing the ground. The gravitational pull is an important factor guiding the flow of the ink/powder used for printing. This restricts the type of 3D printer that could be used as it requires rotation of the substrate if the electronic circuitry is required on the side walls or on complex 3D object. Availability of non gravity based printing will be a game changer as it will enable print head to be placed in any direction that can be independently controlled for embedding electronics in an in-line manufacturing process.

Photolithography screen printing, thermal spray and laser induced sintering are widely used industrial techniques in various other contexts. Photolithography provides the best resolution but it involves expensive vacuum based technology that is not applicable for integrating with 3D printer. Screen printing is the most widely used process for planar objects, however the disadvantages include resolution, organic contaminants and the need for thermal treatment. Thermal spray, plasma spray and laser induced sintering requires high temperature process, restricted in depositing high resolution and they are unsuitable for low glass transition temperature materials.

Recent developments include inkjet and aerosol printing. However, the disadvantages again include post deposition thermal process for removing the organic contaminants and for forming a uniform film. And the removal of organic matter and other contaminants from the deposited films results in void formation, which affects the film quality and device performance. Inkjet printing and aerosol printing also require additional post deposition thermal treatment for deposition of metals and are not suitable for deposition of dielectric coatings with precise thickness control as an external source of energy is required for polymerization.

Plasma spray deposition involves extremely high current of the order of several tens or more of Amperes of current during deposition resulting in extremely high temperature of the plasma rendering it unsuitable for deposition on low glass transition temperature plastics.

The biggest challenge in 3D printing of electronics and functional materials is that the material properties are difficult to be tailored precisely and are highly process dependent including the chemical characteristics, chemical environment, particle size, power, temperature, concentration of feed stock etc. The thermal behavior, mechanical, electronic and chemical characteristics of the materials to be printed and those of the substrate or underlying object vary in their characteristics. Also the macroscopic roughness, uneven surface and non-conformal 3D patterns can pose challenge to the printing process adopted as well as the efficiency, performance, and/or longevity of the printed device.

If the 3D printed object is plastic or biomaterial, the glass transition temperature of the primary 3D printed substrate and that of the electronic materials will vary significantly. The melting point of metals for conductive pattern/circuitry printing is much higher than that of plastics widely used for 3D printing.

Printing resolution in state of the art printing technologies are limited to the nozzle diameter that is available restricting the resolution not lower than 10 microns.

SUMMARY OF THE INVENTION

Adding printed electronics capability to additive manufacturing will widen the scope of 3D printing technology enabling applications ranging from aerospace to automobiles to medical implants. Site selective deposition of conducting, semiconducting films and other electronic materials with precise thickness control on a three dimensional and/or 3D printed object is a challenging task. For any given 3D electronic printing process, the successful integration depends on its ability to coat conformally with precise thickness and aspect ratio control on a range of substrates, planar or non-planar surfaces, complex non-conformal objects, un-even macroscopic roughness surface, bends, sharp edges etc. Hence, a process that is compatible with 3D printing and a process that meets all the desired characteristics mentioned above is required for successful integration of electronics in the 3D printed structure.

In order to produce a ready to use 3D printed object with electronic characteristics and functionalities, it is essential that the electronic materials printing may be carried out either i) at the end of 3D printed finished object or ii) as an in-situ printing along with the 3D printing. In the latter case, the 3D printer while printing a non-electronic object could be paused for printing electronic materials using a different printing process and the 3D printing could be resumed. In this way, the electronics/circuitry need not always be external or at the surface of a 3D printed device. It would rather allow electronics to be part of the 3D structure.

In this context, a process that is compatible with 3D printing, scalable, efficient, reliable and reproducible for electronic materials printing is developed. This innovation provides a low cost, scalable, efficient process for controlled deposition of conductive features, electrode materials, semiconductor materials, magnetic materials, organic coatings, in organic coatings, dielectric materials, catalytic materials and metal oxide nanostructures.

The present invention is an electronic materials printer that can be integrated with a 3D printer or be part of a 3D printing process for additive manufacturing of devices/components/objects with electronics and functional materials. The electronic materials printer presented here is based on a dielectric barrier atmospheric pressure plasma jet system in which both printing and in-situ treatment and post-deposition treatment can be carried out to tailor the materials characteristics. Integration of dielectric barrier plasma printer and plasma treatment jets with the 3D printer increases the capability of embedding high performance electronics in a 3D printed structure aiding in additive manufacturing of functional devices.

A key component of this invention is that the electronic materials can be printed in any direction contrary to conventional gravity based printing used in ink jet, screen printing etc. Non gravity based directional printing is achieved by using a combination of electric field and plasma for directionality. Both the electric field and plasma (ionized gas) are not affected by gravity and hence could be used to control the fluid flow for printing in all directions including sideways and upward forcing print head.

The present invention offers a solution to print materials with varying resolution from tens of nanometers up to tens of centimeters using nozzles made of appropriate materials including micro machined silicon for sub-micron features to plastic, ceramic, glass, quartz for resolutions requiring tens or hundreds of microns or centimeters.

The electronic materials that may be deposited according to the invention include conducting materials, semi-conducting materials, magnetic materials, dielectric materials, low & wide bandgap materials, electrolytic materials, ionic conducting materials, electronic conducting materials, thermally conducting materials, catalytic materials and insulating materials. The novel features of this 3D printing process include: site selective and direct write capability on a range of substrates with low and high glass transition temperature, conformal coating with thickness control over a complex 3D object with uneven surface, low temperature deposition, high aspect ratio, ability to control film thickness without loss of spatial resolution and non gravity based directional printing. This plasma process could be used in conjunction with a 3D printer to develop an end product that contains electronic materials/circuits/components/devices in a 3D printed plastic/biomaterial/ceramic/biological materials/composites etc., This invention addresses the following challenges:
Need for integration of electronic materials printing with 3D printer;
Printing electronic materials in an in-situ (in-line) additive manufacturing process to form electronic devices that are part of a 3D printed object;
directional printing achieved using a combined electric field and atmospheric plasma, that is not based on gravity, which could be efficiently used for printing in all directions including facing ground, facing sideways, facing upwards (roof) or any given direction
Low temperature metallization;
Conformal coating on a range of substrates including planar, non-planar and complex three dimensional objects; and
Controlled physical characteristics of deposited metal films (microstructure, porosity, uniformity).
Ability to tune the print resolution from few tens of nanometers using silicon micro machined print head up to several centimeters using glass/quartz/ceramic/plastic print head nozzles The atmospheric pressure plasma jet deposition based on dielectric barrier discharge process presented here addresses and all the challenges mentioned above, and it is readily scalable for high throughput industrial processing. The presence of a dielectric material between the electrodes at the nozzle reduces the current filament resulting in low temperature deposition that is suitable for low glass transition temperature materials.

The invention has also demonstrated the ability for controlled film thickness without affecting the spatial resolution, precise aspect ratio control, controlled plasma process to prevent arcing and to retain the low temperature nature are key features.

Plasma jet printing offers unique advantage of deposition of layered materials, passivation or insulating coatings in addition to printing of conducting or semiconducting materials Accordingly, there is presented according to the invention, a device for the three-dimensional printing of objects containing electronic materials, including:

a 3D printer print head configured for the layer-by-layer deposition of metal, plastic, ceramic, biomaterial or biological materials to create three-dimensional articles;

a plasma jet print head configured for directional acceleration of materials in a geometric pattern by a combination of dielectric tube with one end of it connected to a manifold containing electrode, gas supply and aerosol supply, other end of the tube connected to a nozzle that is either part of the tube or a detachable module with defined orifice, multiple electrodes disposed over the dielectric tube and gas supply for igniting a dielectric barrier discharge;

a post treatment jet head configured for post treatment of material printed in a geometric fashion by said plasma jet printer;

a plasma jet print head and/or post treatment head both comprising electrodes to apply an electric field and generate atmospheric plasma for non-gravity based directional printing of materials passing through the dielectric tube;

a frame holding said 3D printer, said plasma jet printer, and said post treatment jet in fixed spatial relationship to one another, a translation mechanism configured to translate one of said frame or a printed object relative to one-another for the layer-by-layer printing and post-treatment of said object by said 3D print head, said plasma jet print head, and said post-treatment jet head.

and a control system configured for controlling said translation mechanism and said 3D print head, said plasma jet print head, and said post-treatment jet head for the layer-by-layer printing of a three-dimensional object according to a pre-selected pattern with resolution and line width varying from as low as 50 nm unto 10 cm.

Geometric pattern has used herein refers to precise control of the length, width or radius and height of the material printed to form 2-dimensional and 3-dimensional patterns, for example linear, circular, annular, meander, polyhedron type patterns. The geometrical pattern can be of very defined aspect ratio, extreme aspect ratio and also tunable in both 2-dimensional as well as 3-dimensional geometries. The geometrical pattern can vary from nanoscale to microscope to macroscale in its dimensions. The length and width can vary from sub-micron to several centimeters to meters. The height of the printed pattern can varying from few 10's of nanometers to several centimeters to meters.

There is further provided according to the invention, a a device for the three-dimensional printing of objects containing electronic materials in which the electronic materials are selected from the group consisting of conducting materials, semi-conducting materials, magnetic materials, dielectric materials, low and wide bandgap materials, electrolytic materials, ionic conducting materials, electronic conducting materials, thermally conducting materials, magnetic materials, catalytic materials, organic coatings, inorganic coatings and insulating materials.

DETAILED DESCRIPTION OF THE INVENTION

A central feature of this invention is an additive manufacturing process using an integrated layer-by-layer 3D plasma jet printing of electronic materials, that is, using a highly directional, direct write plasma jet process for depositing electronic materials, with precise thickness and aspect ratio control, on a 3D printed object to create electronic devices using a 3D printer. Unlike any other printing process, 3D plasma jet printing process of the present invention enables controlling of material properties. Unlike any other additive manufacturing technology, this plasma jet printing enables non-gravity based directional printing, controlled jointly by electric field and atmospheric plasma that could be used for printing in any direction by moving the print head rather than moving the substrate to be coated. Another unique feature of the invention is that the same plasma jet used for printing can be used for site selective post deposition treatment of deposited materials by closing the nanoparticle-aerosol supply and by letting appropriate gas or gas mixture for treatment. A unique advantage of 3D plasma jet printing process is that the uniformity of electrical/chemical/mechanical characteristics throughout the film can be ensured by appropriate post deposition treatment after addition of each layer in the printing process. The printing process can be interrupted in between for post-deposition treatment of underlying layers and resumed with 'further deposition.

Figure 1:
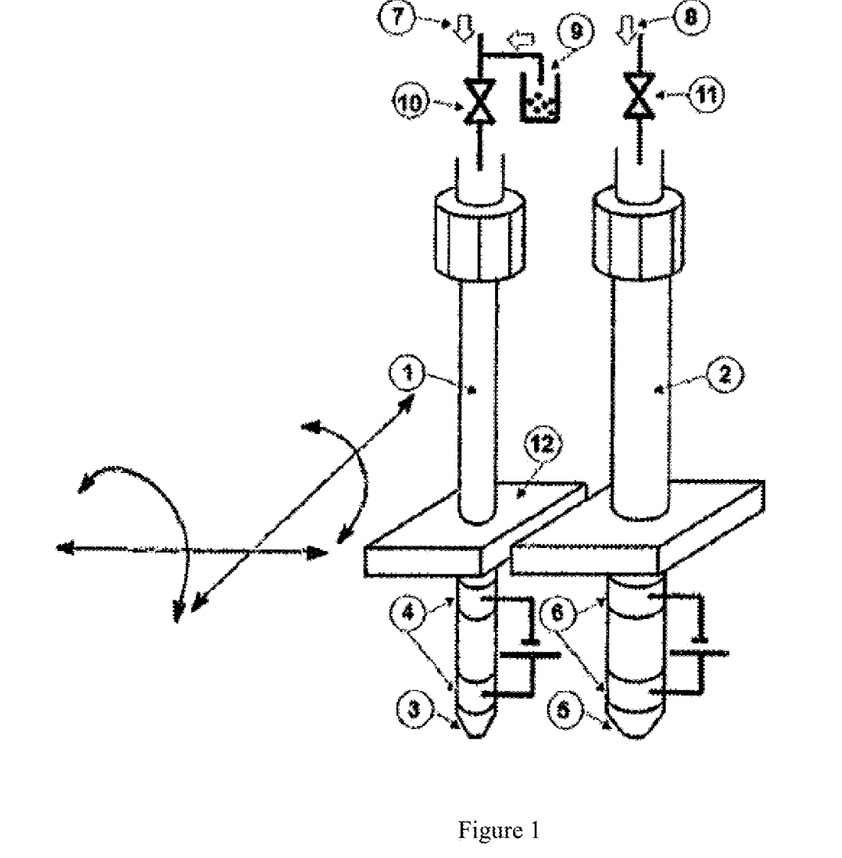
FIG. 1 is a perspective view of a plasma printer jet and post-treatment jet according to an embodiment of the invention.

Referring to FIG. 1, a plasma printer jet and post-treatment jet according to an embodiment of the invention includes plasma printer jet 1 and post treatment jet 2. The plasma printer jet includes a print head nozzle 3, metallic electrodes 4, a gas inlet 7 for the print head, Micro/nano colloids 9 containing particles/precursors to be deposited, control valve 10, and holder 12. The post-treatment jet includes post treatment head nozzle 5, metallic electrodes 6, a gas inlet 7 for the print head, and control valve 11. The diameter of the print nozzle in the plasma jet printer and in the post-treatment jet can vary from 1 micro meter up to 10 centimeter in diameter.

Figure 2:
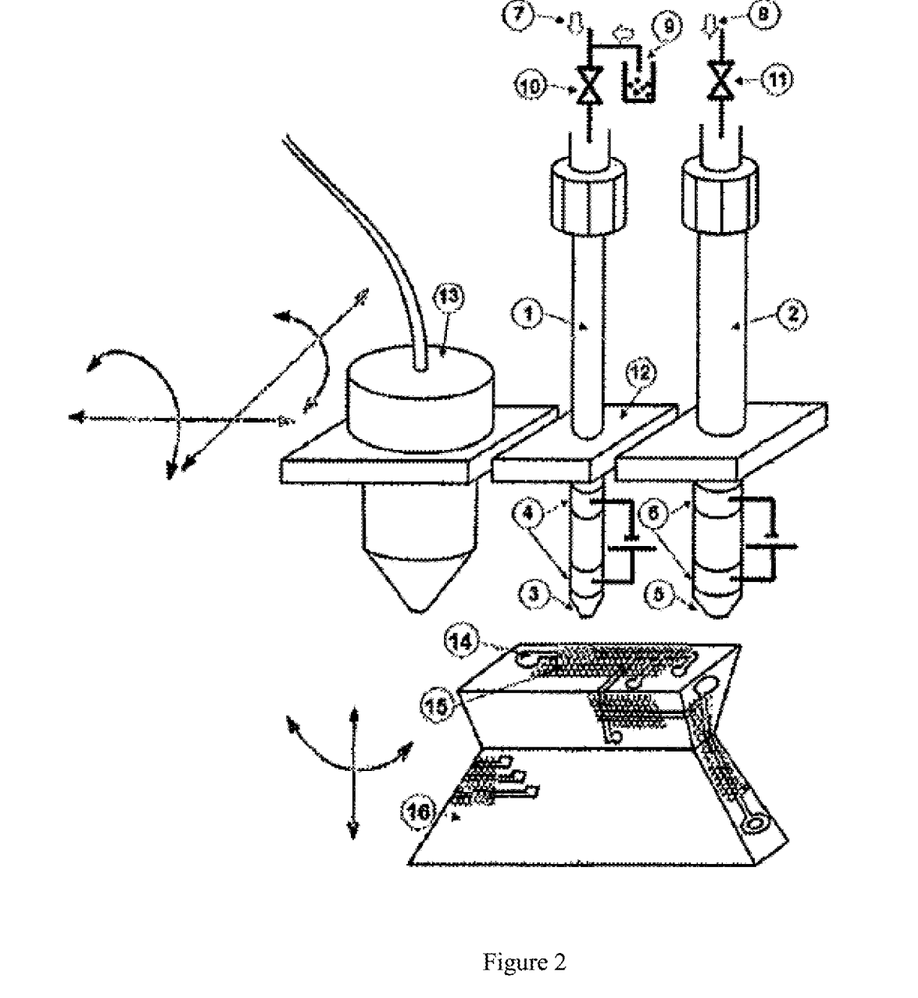
FIG. 2 is a perspective view of the integration of a plasma jet printer and post-treatment jet with a 3D printer for the 3D printing of electronics according to an embodiment of the invention.

Referring to FIG. 2, an integrated plasma jet printer/post-treatment jet and 3D printer for 3D printing of electronics according to an embodiment of the invention includes plasma printer jet 1, post treatment jet 2 and 3D printer (metallic/plastic/ceramic) 13, and is shown printing a 3D printed object 16 (which may be metal, plastic or ceramic), including conductive pattern 14 on the 3D printed object, and dielectric coating 15 over the conductive pattern. All reference numbers for the plasma jet printer and post-treatment jet are the same as for FIG. 1.

As shown in FIG. 2, printing of conductive traces, contact pads and insulating layers can be done on complex 3D printed object including the bents, edges and angular surfaces.

Figure 3A:
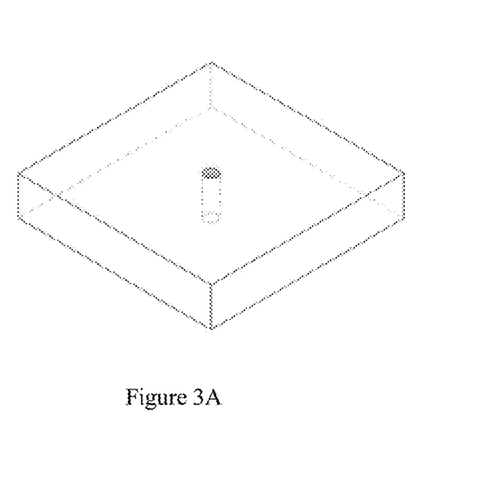
FIG. 3A shows an orifice made through silicon that could be used for printing sub-micron features.
Figure 3B:
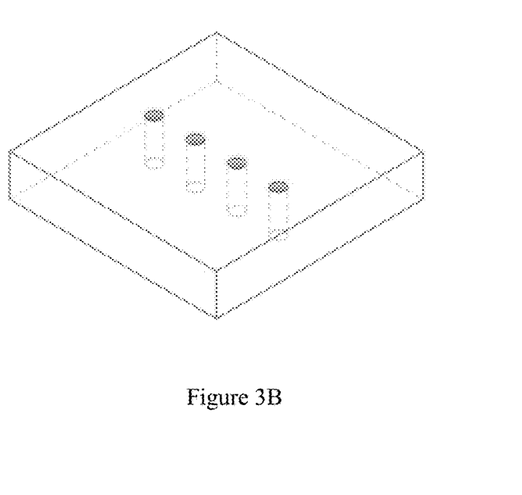
FIG. 3B shows multiple orifices for high throughput parallel printing.
Figure 3C:
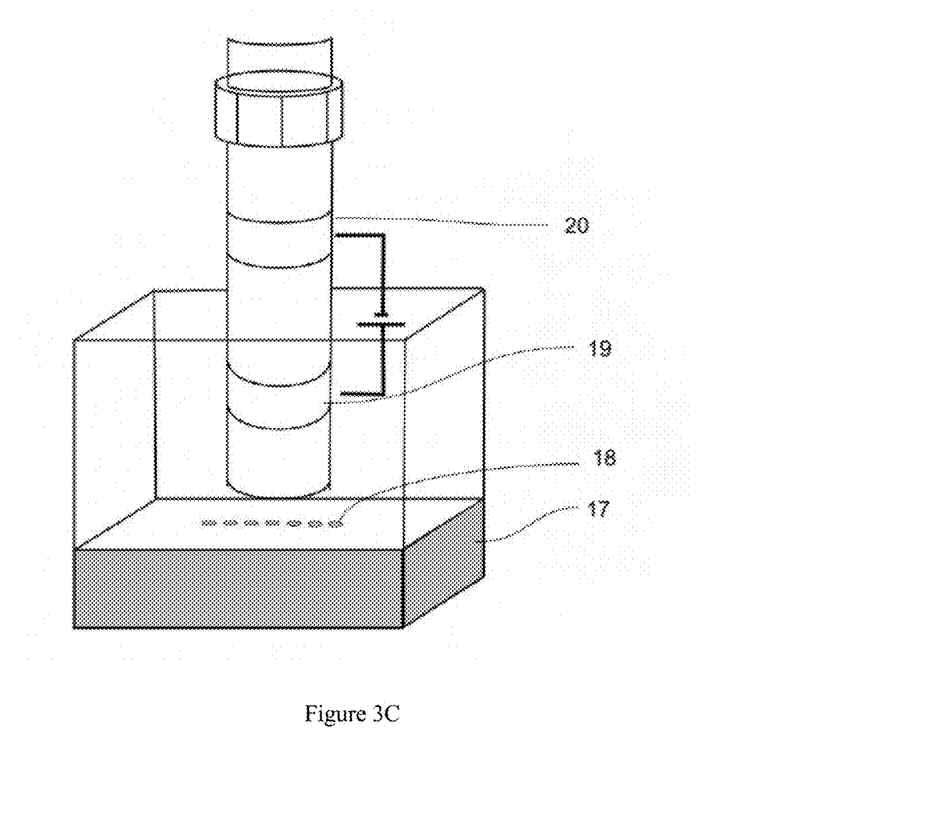
FIG. 3C shows a plasma jet print head according to an embodiment of the invention.

Referring to FIGS. 3A-3C, the print head can also be made of silicon wafer with the print nozzle diameter fixed by silicon micro machining. The silicon micro machining can enable precise tuning of the nozzle diameter for printing whereby the resolution of the printing can be increased and line width reduced to sub-micron and nanometer level. FIG. 3A shows an orifice made through silicon that could be used for printing sub-micron features. FIG. 3B shows multiple orifices for high throughput parallel printing. FIG. 3C shows a plasma jet print head where the print resolution could be increased and the line width reduced by combining micro machined silicon with precisely tailored orifice diameter wherein. (17) is the silicon substrate, (18) are orifices made through silicon using well established silicon micro fabrication techniques with the orifice diameter varying between 50 nm up to 1 cm, (19) and (20) are electrodes connected to high voltage power supply for generating the plasma. The print head nozzle in the case of print head made of silicon wafer can vary from 50 nanometer up to 1 centimeter in diameter. The entire plasma jet printer could be made using micro fabricated silicon.

Figure 4A:
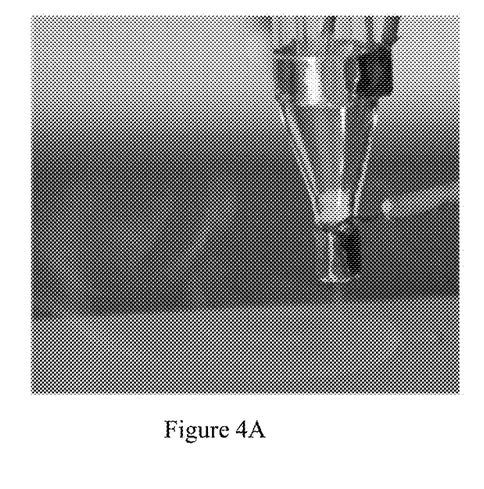
FIG. 4A shows a photograph of the print head with aerosol flow in absence of electric field and plasma.
Figure 4B:
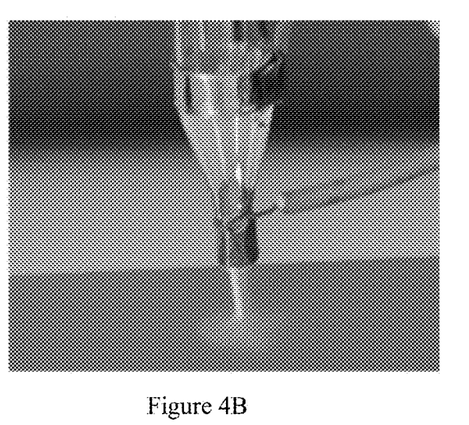
FIG. 4B shows a photograph of the print head with aerosol flow in the presence of electric field and plasma.

Referring to FIGS. 4A and 4B, the materials carried in to the plasma zone of the print head are subjected to bombardment by electrons, ions and radicals in the plasma. In the plasma jet, the charges move under the influence of the electric field and the magnetic field that is perpendicular to the electric field. An inward moving magneto hydrodynamic Lorentz force is created through the interaction between the two fields. It is well known that the electrons are depleted in the sheath near the wall and the plasma is confined to the central core. As a result of the Lorentz force and the confinement, the pressure in the plasma core increases drastically resulting in momentum transfer and high packing density. The generated directionality due to the plasma and the electric field is evident in FIG. 4B compared to the scenario in FIG. 4A where the aerosol, without any plasma, spreads widely upon leaving the nozzle with no directionality.

The particle acceleration in the plasma depends on the particle diameter, particle density, flow rate of the gas and the viscosity of the colloid. The chemical characteristics, mechanical properties and the quality of the coating depend on various parameters including the nature and type of gas used for generating the plasma, nature and type of particles, particle size, viscosity of the colloid, nature and type of solvent used for suspending the micro/nanoparticles, distance between the nozzle and the substrate surface, distance between the electrodes, voltage applied between the electrodes, nozzle size, nature and type of dielectric barrier. For example, to plasma print materials with no change in morphology and chemistry of the particles, a helium plasma that inherently contains no filamentary discharge and low electron density is used. In order to change the morphology of the particles, argon plasma containing higher electron density than that of helium is used. To further increase the morphological changes, nitrogen or hydrogen may be introduced in to the plasma. For changing the electronic structure, for example to reduce the oxidation state of materials being printed, hydrogen may be introduced in the plasma. To oxidize the material while printing, oxygen gas may be introduced. A combination of oxygen and CF4 may be used to etch the material pre and post-printing. Particle shapes like spheres, rods, plates, wires may be used depending on the end use application. For example, wires may be printed to get good electrical conductivity, while rods and plates may be used for optical applications.

Plasma Jet printing offers advantages such as high deposition rate, good adhesion, cross-linking of organic/inorganic polymers, high density packing, layered deposition, printing of conducting, semiconducting and insulating coatings. During the printing process, the presence of externally applied electric field causes magnetic field and Lorentz force that influence the particles present in the plasma. The presence of these forces along with the temperature effect causes a high momentum transfer to the particles present in the plasma resulting in enhanced adhesion and high packing density By careful choice of printing process conditions including gas used for the plasma jet, pre- and post-deposition treatment using the plasma jet, deposition time, gas ratio etc., the amount of thermal energy imparted to the depositing materials and the chemical environment needed for tailoring the chemical and electrical characteristics can be controlled. For example, gases with different thermal conductivity and with varying reactive properties can be used for deposition as well as for post-deposition treatment to form electronic circuitry/contact pad/metal-dielectric sandwich/electronic components etc. For example, the thermal conductivity of helium is higher than that of argon and hence the substrate temperature can be changed by using appropriate gas flow of helium and other gas mixtures. When nitrogen is introduced into the helium plasma, the electron density, electron temperature and the current density increases. The substrate temperature can be controlled from 35° C. with pure helium flow to up to 200° C. with addition of hydrogen, while the temperature remaining in between 35° C. to 200° C. with addition of argon or nitrogen. The nature of materials deposited on a 3D printed object with controlled thickness include conducting traces/electrodes/sensors/dielectric/semiconductors/magnetic/solar cell/battery materials. 3D plasma jet printing offers unique advantage of site selective deposition with controlled thickness and uniformity on trenches, macroscopic rough features, edges, bends, sharp curves and complex 3D features.

The invention presents the following features and advantages:
1. In-situ (in line) 3D printing of electronics for additive manufacturing;
2. Integration of electronic materials printing with 3D printing;
3. Directional printing using combined electric field and plasma to enable printing in any direction and be independent of gravity for fluid flow
4. Printing of conductive traces, wiring, contact pads, semiconducting materials, insulating materials, catalytic materials, magnetic materials, organic coatings, inorganic coatings and dielectric coatings for embedding electronic functionalities in 3D printed plastic or ceramic or metal object;
5. In-situ surface chemical modification of materials in 3D printing using auxiliary post treatment plasma jet; and
6. Scalability of the process for high throughput and rapid prototyping.
7. Ability to tune the print resolution from few tens of nanometers using silicon micro machined print head up to several centimeters using glass/quartz/ceramic/plastic print head nozzles Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. An apparatus for plasma printing, comprising:
(i) a plasma jet printer comprising a first dielectric tube with first and second electrodes attached to an outer surface of said first dielectric tube, said first electrode connected to a ground and said second electrode connected to a high voltage power supply; a print head nozzle connected to a first end of said first dielectric tube downstream from said first and second electrodes; a gas inlet connected to a second end of said first dielectric tube; a deposit inlet connected to said gas inlet; has been inserted after the term gas inlet; wherein said print head nozzle comprises one or more orifices and the diameter of each of said one or more orifices of said print head nozzle is about 50 nm to about 1 cm; and
(ii) a post treatment jet comprising a second dielectric tube with third and fourth electrodes attached to an outer surface of said second dielectric tube, said third electrode connected to a potential difference and configured to generate atmospheric plasma within said second dielectric tube; a post treatment head nozzle connected to one end of said second dielectric tube and downstream from said third and fourth electrodes; a gas inlet connected to a second end of said second dielectric tube.

2. The apparatus of claim 1, wherein the print head nozzle is made of silicon.

3. The apparatus of claim 2, wherein the plasma jet printer is made of silicon.

4. The apparatus of claim 1, wherein said post treatment head nozzle comprises one or more orifices.

5. The apparatus of claim 4, wherein the diameter of each of said one or more orifices of said post treatment head nozzle is about 1 um to about 10 cm.

6. The apparatus of claim 1, wherein said print head nozzle comprises silicon, glass, quartz, ceramic, or a combination thereof.

7. The apparatus of claim 1, further comprising a three-dimensional (3D) printer configured for layer-by-layer deposition of a printing material to create a 3D object.

8. The apparatus of claim 7, wherein said 3D printer is metallic, plastic, ceramic, or a combination thereof.

9. The apparatus of claim 7, wherein said printing material comprises metal, plastic, ceramic, a biomaterial, a biological material, or a combination thereof.

10. The apparatus of claim 1, wherein said deposit inlet of said plasma jet printer is a source of said one or more electronic materials to be printed by said plasma jet printer.

11. The apparatus of claim 10, wherein said one or more electronic materials comprise micro-sized and/or nano-sized colloids.

12. The apparatus of claim 10, wherein said one or more electronic materials comprise conducting material particles, semi-conducting material particles, magnetic material particles, dielectric material particles, low bandgap material particles, wide bandgap material particles, electrolytic material particles, ionic conducting material particles, electronic conducting material particles, thermally conducting material particles, catalytic material particles, insulating material particles, or a combination thereof.

* * * * *